(12) United States Patent
Van Lunteren (10) Patent No.: US 7,519,070 B2
(45) Date of Patent: Apr. 14, 2009

(54) METHOD AND APPARATUS FOR DEEP PACKET PROCESSING

(75) Inventor: Jan Van Lunteren, Gattikon (CH)

(73) Assignee: International Business Machines Corporation, Armonk, NY (US)

( * ) Notice: Subject to any disclaimer, the term of this patent is extended or adjusted under 35 U.S.C. 154(b) by 616 days.

(21) Appl. No.: 10/527,493

(22) PCT Filed: Jun. 26, 2003

(86) PCT No.: PCT/EP03/08210

§ 371 (c)(1),
(2), (4) Date: Sep. 28, 2005

(87) PCT Pub. No.: WO2004/025920

PCT Pub. Date: Mar. 25, 2004

(65) Prior Publication Data

US 2006/0095588 A1 May 4, 2006

(30) Foreign Application Priority Data

Sep. 12, 2002 (EP) .................................. 02368098

(51) Int. Cl.
*H04L 12/28* (2006.01)

(52) U.S. Cl. .................. 370/397; 370/398; 370/399; 370/400; 370/401; 370/410

(58) Field of Classification Search .................. 370/397, 370/398, 399, 400, 401, 410
See application file for complete search history.

(56) References Cited

U.S. PATENT DOCUMENTS

| 6,067,041 | A | 5/2000 | Kaiser |
| 6,947,430 | B2 * | 9/2005 | Bilic et al. ............. 370/395.71 |
| 7,327,759 | B2 * | 2/2008 | Calvignac et al. ........... 370/474 |
| 7,376,125 | B1 * | 5/2008 | Hussain et al. .............. 370/352 |
| 2003/0039249 | A1 * | 2/2003 | Basso et al. ................. 370/394 |
| 2007/0011734 | A1 * | 1/2007 | Balakrishnan et al. ........ 726/13 |

FOREIGN PATENT DOCUMENTS

JP 484282 B 4/2002

* cited by examiner

*Primary Examiner*—Edan Orgad
*Assistant Examiner*—Andrew C Lee
(74) *Attorney, Agent, or Firm*—Vazken Alexanian (57) ABSTRACT

A method and apparatus for deep packet processing including a parsing and a searching method supported by a data structure storing the state-transition rules in the state-transition rule tables of a programmable state machine for parsing. The state-transition rule table is then compressed using the BaRT compression algorithm. Each transition rule comprises a test value, a test mask and a next state field. In a second embodiment the state-transition rule table is split into more than one state-transition rule table corresponding to disjoints state spaces, thus allowing more flexibility in the use of storage space. Finally a parsing and searching method can be implemented using the same hardware. The searching and parsing methods can be implemented alternatively or in any combination at wire-speed.

1 Claim, 12 Drawing Sheets

| current state / input | next state |
|---|---|
| 101 1111b | 101b (S5) |
| ⋮ (state S5) | ⋮ |
| 101 0000b | 101b (S5) |
| 100 1111b | 000b (S0) |
| ⋮ | ⋮ |
| 100 1100b | 000b (S0) |
| 100 1011b | 101b (S5) |
| 100 1010b | 100b (S4) |
| 100 1001b (state S4) | 000b (S0) |
| ⋮ | ⋮ |
| 100 0010b | 000b (S0) |
| 100 0001b | 001b (S1) |
| 100 0000b | 000b (S0) |
| 011 1111b | 011b (S3) |
| ⋮ (state S3) | ⋮ |
| 011 0000b | 011b (S3) |
| 010 1111b | 000b (S0) |
| ⋮ | ⋮ |
| 010 1011b | 000b (S0) |
| 010 1010b | 100b (S4) |
| 010 1001b | 000b (S0) |
| ⋮ (state S2) | ⋮ |
| 010 0010b | 000b (S0) |
| 010 0001b | 011b (S3) |
| 010 0000b | 000b (S0) |
| 001 1111b | 000b (S0) |
| ⋮ | ⋮ |
| 001 1011b | 000b (S0) |
| 001 1010b | 100b (S4) |
| 001 1001b | 000b (S0) |
| ⋮ (state S1) | ⋮ |
| 001 0011b | 000b (S0) |
| 001 0010b | 010b (S2) |
| 001 0001b | 001b (S1) |
| 001 0000b | 000b (S0) |
| 000 1111b | 000b (S0) |
| ⋮ | ⋮ |
| 000 1011b | 000b (S0) |
| 000 1010b | 100b (S4) |
| 000 1001b | 000b (S0) |
| ⋮ (state S0) | ⋮ |
| 000 0010b | 000b (S0) |
| 000 0001b | 001b (S1) |
| 000 0000b | 000b (S0) |

METHOD AND APPARATUS FOR DEEP PACKET PROCESSING

CROSS REFERENCE AND PRIORITY

This application filed under 35 USC 371, is cross-referenced with, and claims priority from, International Patent Application PCT/EP2003/008210 filed on Jun. 26, 2003, and published in English with Publication No. WO 2004/025920 on Mar. 25, 2004, under PCT article 21(2), which in turn claims priority of EP 02368098.6, filed on Sep. 12, 2002.

FIELD OF THE INVENTION

The present invention generally relates to telecommunication packet processing and particularly relates to a method for flexible parsing and searching of information in the packet including the packet payload.

BACKGROUND OF THE INVENTION

Packet classification is a function implemented in networking equipment such as routers and switches, that extracts information from an incoming packet (this is called parsing) and uses this to search a data base with rules. If a matching rule is found, then the processing of that packet will be based on data associated with that rule. The parsed information, the rules, and the way the rules are searched are dependent on the application.

For example, with an IP forwarding application, the packet classification consists of parsing the IP destination address from the IP header, which is then used to search a routing table according to a longest-matching prefix search. The routing table entry that results from this search provides the address of the next hop to which the packet will be forwarded. Another example is a firewall application, in which several fields (e.g., IP source and destination addresses, TCP port numbers, PROT byte) are parsed from the packet header, and are then used to search the highest-priority matching rule from a set of firewall rules. Data associated with this firewall rule will then indicate whether the packet will be permitted or denied access through the firewall.

Conventional applications, such as the two described examples, have in common that the information is parsed from well-known fields at fixed locations within the packet headers (up to layer 4), which have fixed and relatively small sizes (typically up to 32 bits). Furthermore, the classification can be performed in two distinct phases: First the information is parsed from the packet header. Next, the parsed information is used to search a data base.

Web-server load balancing, intrusion detection and virus scanning are examples of important emerging applications that require more advanced packet classification capabilities, than as required by "conventional" applications as described above. These more advanced capabilities relate specifically to the following aspects:

1) Besides information from the packet header, also information from the packet payload needs to be inspected.
2) The location and the amount of information that has to be inspected within the payload is not always known in advance and can for several applications only be determined during the classification operation. Some applications require the use of pattern-matching and regular-expression-based searches for locating information within the payload.
3) The amount of information involved in the packet classification can consist of up to multiple hundreds of bytes.

Examples of information that has to be inspected within the payload for a web-server load balancer application, are URLs, cookies, and SSL identifiers. Another example is a set of known character strings related to viruses that are checked for by a virus-scan application.

From the above it can be understood that the packet classification now becomes more complex in the following two respects:

1) The parsing operation becomes more difficult for applications in which the location and amount of information that needs to be parsed is not known in advance, and for applications for which a large amount of information needs to be parsed.
2) For certain applications the two distinct phases of parsing and searching cannot be used, but instead it is necessary to repeat parsing and searching in alternating steps or combine the two steps (e.g., pattern-matches).

In addition to the functional requirements outlined above, packet classification must be performed on the fly on incoming packets (this is called wire-speed packet classification) for typical link speeds between 1 Gb/sec and 10 Gb/sec today. A second requirement is that the data structures used for the packet classification should be organized such that a minimum amount of memory is needed for storing them, in order to minize the costs. A third requirement is the support for fast updates of the rule set, as required by the dynamic nature of several new applications (e.g., web-server load balancing).

The standard solution for realizing a flexible parse function suitable for advanced packet classification as described above, is a programmable state machine. The concept and disadvantages of a prior-art implementation of a programmable state machine will now be illustrated using FIG. 1 and FIG. 2

FIG. 1 shows a state diagram for parsing two patterns "121h" (h means hexadecimal) and "ABh" from an input stream of 4-bit characters. There are 6 possible states (S0, S1, S2, S3, S4, S5) represented by circles, the arrows represent the state transitions. Nodes S3 and S5 are end states.

Figure 2:
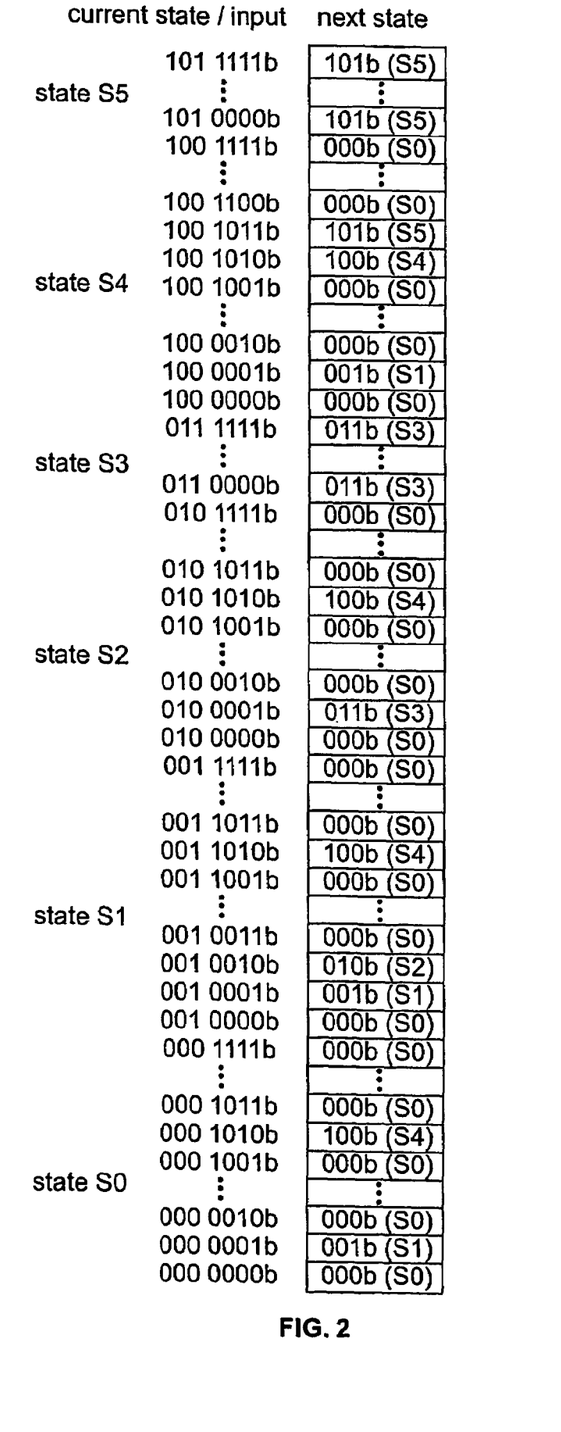
FIG. 2 shows a prior art programmable state machine implementation for the state diagram of FIG. 1.

FIG. 2 shows a prior-art implementation of a programmable state machine for the state diagram of FIG. 1, which requires one memory access per state transition. In this example the states are assigned the following 3-bit state vectors:

| |
|---|
| S0 - 000b |
| S1 - 001b |
| S2 - 010b |
| S3 - 011b |
| S4 - 100b |
| S5 - 101b |

In FIG. 2 the current state (3 bits) concatenated with the 4-bit input value is used as an offset (address) into a table containing the next state for each possible combination of a current state and input value, resulting in a total of $2^{(3+4)}=2^7=128$ table entries. Disadvantages of this approach are (1) the inefficient use of storage (e.g., there are 128 table entries in FIG. 2 of which many contain the same next state) and (2) the large number of table entries that have to be written while "programming" the table for the given state diagram, resulting in a long construction (update) time.

In the US patent of Solidum, US06167047, a programmable state machine is disclosed for packet classification. The Solidum patent approach requires at most one memory access per state transition, but requires less memory than the implementation concept shown in FIG. 2. A disadvantage of the Solidum approach is that it requires significantly more complex hardware: at least one processor, one program memory and one separate stack memory. This results in increased chip-area costs and increased power-consumption.

A prior-art solution for realizing a flexible search function suitable for advanced packet classification as described above, is a tree structure. One example is a Patricia tree as described in D. R. Morrison original paper "Patricia—Practical Algorithm to Retrieve Information Coded in Alphanumeric", Journal of the ACM, Vol. 15, 1968.

A disadvantage of the prior-art is that no solutions exist that can support both efficient parsing and efficient searching. A programmable state machine cannot efficiently implement a search since the state space is typically too large, resulting in significant memory requirements and/or complex logic to determine the next state. On the other hand, a tree structure cannot implement parsing as efficiently as a programmable state machine, especially because the latter can more efficiently handle typical state transitions that are more complex than the branch functions which occur in a typical tree search. Therefore, implementing parsing using a tree structure, would require many nodes and therefore results in significant memory requirements.

Consequently, a disadvantage of the prior-art is that different hardware has to be used to implement the parsing and searching. A second disadvantage is that this makes it more difficult to realize a more advanced packet classification function, that supports the alternating use of parsing and searching or the combination of parsing and searching as described above.

SUMMARY OF THE INVENTION

It is therefore an object of the present invention to provide a deep packet processing method and apparatus which could sustain high speed while performing parsing and searching operations.

It is another object of the invention to reduce storage requirements and hardware-implementation complexity.

With the use of a compression technique already disclosed for a lookup scheme implementation, a preferred embodiment of the invention provides a powerful data structure allowing a combination of an efficient programmable state machine for parsing and an efficient tree based searching mechanism.

In a particularly preferred embodiment of the invention, the same hardware can be used for parsing and searching.

BRIEF DESCRIPTION OF THE DRAWINGS

Preferred embodiments of the present invention will now be described, by way of example only, with reference to the accompanying discussions, in which:

FIG. 1 illustrates a state diagram for parsing patterns from an input stream of 4-bit characters;

DETAILED DESCRIPTION OF THE PREFERRED EMBODIMENT

Programmable State Machine:

In a preferred embodiment of the present invention, there is provided a method to perform deep packet processing. The method comprises the creation of a data structure which improves the programmable state machine of the prior art. In the data structure, state transitions are represented as a list of so called state-transition rules, each containing a ternary match condition for the combination of the current state and input value, and a next state. With ternary match conditions, the matching patterns comprise bits having three possible states 0, 1 or X, X being a wild-card symbol for the "don't care" condition.

If a state-transition rule contains a ternary match condition that matches a given current state and input, then this state-transition rule is said to be matching. If multiple state-transition rules can all match the same current state and input, then these state-transition rules are assigned different priorities.

For a given current state and input value, the next state is now determined by the highest-priority state-transition rule, matching the current state and input value.

An example of a list of state-transition rules for the state machine in FIG. 1 is (with decreasing priorities):

| transition | state | input | [state input] |    | next state |
|------------|-------|-------|---------------|----|------------|
| 1          | S2    | 1h    | [010 0001b]   | -> | S3 [011b]  |
| 2          | *     | 1h    | [xxx 0001b]   | -> | S1 [001b]  |
| 3          | S1    | 2h    | [001 0010b]   | -> | S2 [010b]  |
| 4          | S4    | Bh    | [100 1011b]   | -> | S5 [101b]  |
| 5          | *     | Ah    | [xxx 1010b]   | -> | S4 [100b]  |
| 6          | *     | *     | [xxx xxxxb]   | -> | S0 [000b]  |

('*' and 'x' are wild-card symbols meaning "don't care", '*' being used as a wild-card for the entire state or the entire input value, while 'x' being used as a wild-card for a single bit position).

Note that one possible algorithm for generating those rules is described later in the document in reference to FIG. 12.

The next state is now determined by searching the highest-priority state-transition rule that matches the current state S and input I. For example, if the current state is S2 and the input equals 1 then state-transition rule 1 will match, indicating that the next state will be S3. For any other current state in combination with an input equal to 1, state-transition rule 2 will match, resulting in a transition to state S1.

If the current state is s0 and the input equals (0,2 ... 9, B .. F) then the next state will be s0.

If the current state is s0 and the input equals A then the next state will be s4.

If the current state is s4 and the input equals (0,2 ... 9,C .. F) then the next state will be s0.

If the current state is s0 and the input equals 1 then the next state will be s1.

If the current state is s1 and the input equals (0,3 ... 9,B .. F) then the next state will be s0.

If the current state is s2 and the input equals (0,2 ... 9,B .. F) then the next state will be s0.

If the current state is s4 and the input equals A then the next state will be s4.

If the current state is s4 and the input equals B then the next state will be s5.

If the current state is s2 and the input equals A then the next state will be s4.

If the current state is s4 and the input equals 1 then the next state will be S1.

If the current state is s1 and the input equals 1 then the next state will be S1.

If the current state is s1 and the input equals 2 then the next state will be s2.

If the current state is s1 and the input equals A then the next state will be s4.

All state transitions in FIG. 1 are described with only 6 state-transition rules.

Figure 3:
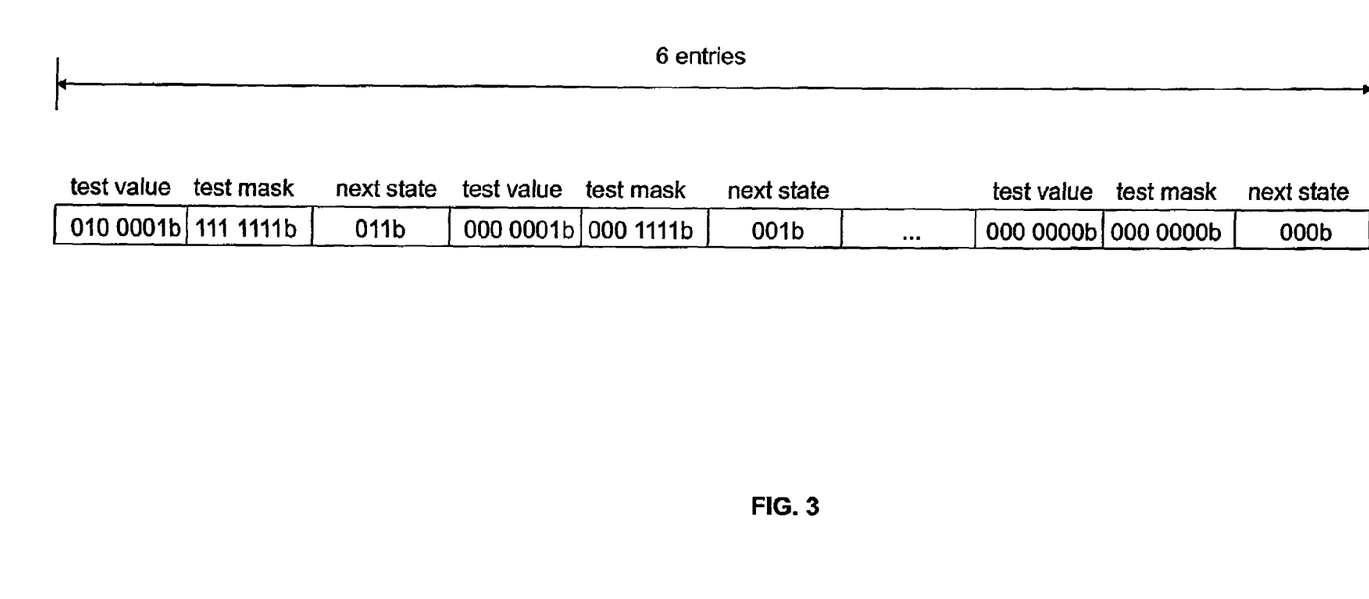
FIG. 3 illustrates 6 transition rule entries according to a first preferred embodiment, which implement the state diagram of FIG. 1, and are stored in one register or one memory location.

If there are only a small number of state-transition rules, then in the preferred embodiment, these are stored as so called state-transition rule entries, abbreviated to transition rule entries, in a register or in one memory location. This is shown in FIG. 3 for the above 6 state-transition rules. The ternary match condition of each transition rule entry is stored as a combination of a (binary) test value and a (binary) test mask. The ternary match condition will match if the bits of the current state and input value equal the bits at the bit positions corresponding to the set bits in the test mask. The remaining bit positions are don't care. For example, the ternary match condition "xxx0001" of state-transition rule 2 is stored as a test value 0000001b and a test mask 0001111b in the corresponding transition rule entry.

In a preferred embodiment of the present invention, the next state is determined by performing a parallel comparison of the current state and input character, against the ternary match conditions, stored as test values and test masks, in the corresponding transition rule entries. In case of multiple matches, the matching transition rule entry with the highest priority will be selected (in FIG. 3 the entries are stored in order of decreasing priority from left to right). This operation is performed for each new 4-bit input character until one of the two end states (S3 or S5) is reached.

BaRT Compression:

For state machines that have too many states, implementation issues (e.g., memory width, timing) can make it impossible to store all transition rule entries in one memory location or to test all entries in parallel. In this case, the preferred embodiment uses the BaRT compression scheme to distribute the transition rule entries over multiple memory locations. The BaRT compression scheme has been disclosed in a conference paper by Jan Van Lunteren, published in the proceedings of IEEE Globecom, volume 3, pages 1615-1619, November 2001, under the title 'Searching Very Large Routing Tables in Wide Embedded Memory'.

The BaRT compression scheme is based on a special hash function for exact-, prefix- and ternary-match searches. The hash index (which is called compressed index) comprises a selected subset of the input bits (in this case the current state and input character). These bits are chosen such that the number of collisions for each compressed index value is bounded by a value N. In other words, for any given value of the compressed index, at most N entries can possibly match the input. These entries are then stored at the location within the hash table (which is called compressed state-transition rule table in the preferred embodiment) corresponding to that compressed index value. This concept will now be explained by applying it upon the example of FIG. 3 for a collision bound N=4.

Figure 4:
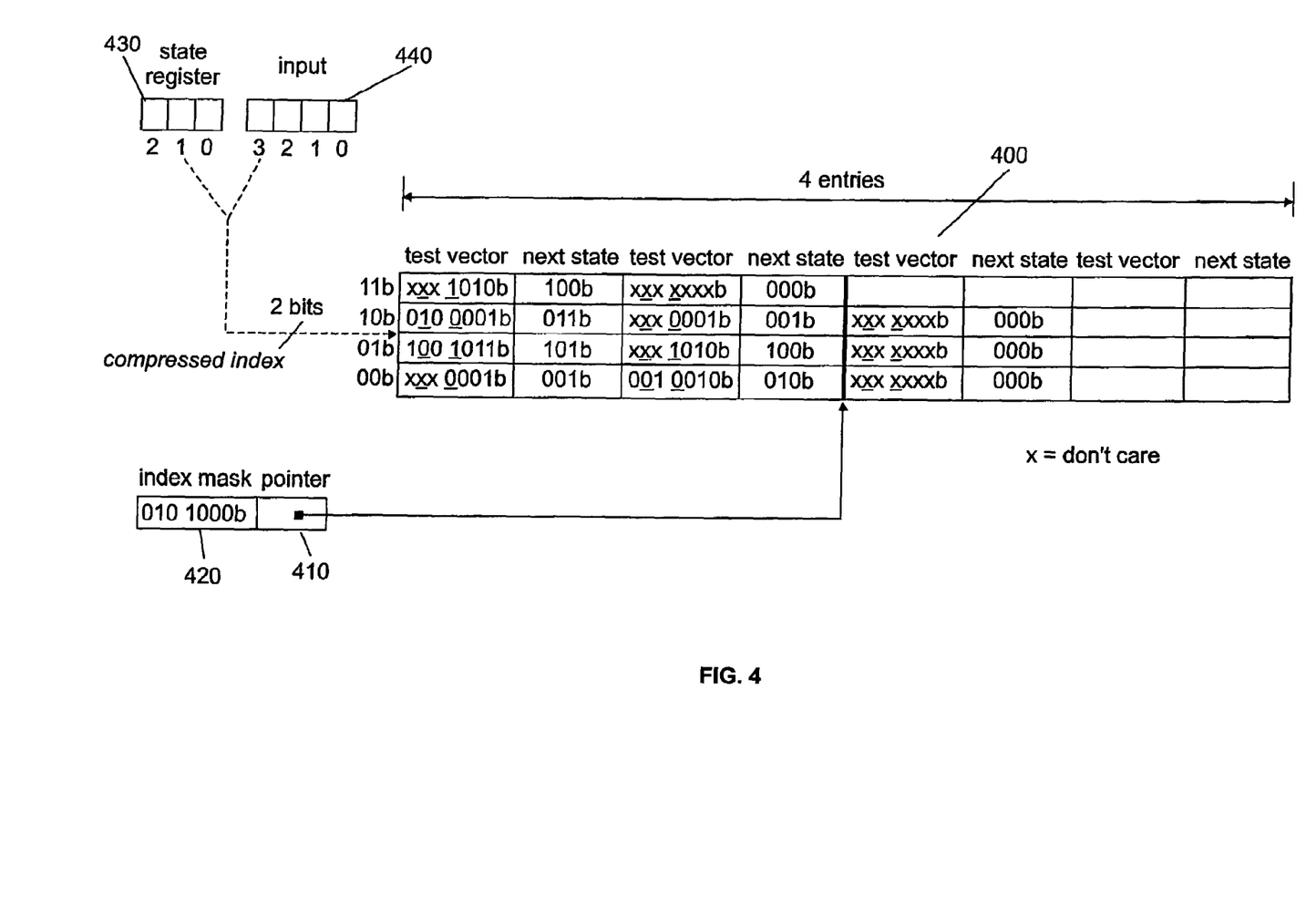
FIG. 4 illustrates a BaRT-compressed state-transition rule table according to the first preferred embodiment, which implements the state diagram of FIG. 1, and is organized such that a maximum of N=4 transition rule entries are stored in each memory location.

In FIG. 4, the compressed index consists of the second bit of the state register 430 and the most significant bit of the 4-bit input 440. A method to determine the bits that form the compressed index will be discussed later. Because the compressed index consists of 2 bits, the compressed state-transition rule table will contain 4 ($2^2$) blocks, each containing at most N=4 transition rule entries. A block is illustrated as a row in FIG. 4. Each block is stored in one memory location and can be read in one memory access. The base address for the table is stored in a pointer 410. The compressed index can be specified by a so called index mask 420 which has set bits at the bit locations that correspond to the bits that are extracted as compressed index.

In FIG. 4, the test value and the test mask fields of the transition rule entries are combined into one ternary test vector field, in order to make the figure more compact and understandable. The ternary vectors consisting of '0', '1', and 'x' are stored in the state-transition rule table 400 wherein, for instance, a ternary "xxx 0001" corresponds to a test value/test mask combination "000 0001/000 1111".

Now for each value of the compressed index, at most N=4 transition rule entries can match the current state and input character. For example, if the second bit of the current state and the most significant bit of the input character would both equal zero, then only the three transition rule entries that are contained within the block corresponding to a compressed index value 00b can possibly match the current state and input character. All state-transition rule entries, the same ones as shown in FIG. 3, are distributed in this way over the various compressed index values (note that certain transition rule entries can be matching for multiple compressed index values and are therefore stored in more than one block). The bits of the ternary vectors, that are part of the compressed index, are underlined within the transition rule entries in FIG. 4 for illustrative purposes.

For a given current state and input character, the next state can now be determined in the following way. First, the compressed index bits are extracted from the current state and input character, based on the index mask 420. Next, this compressed index is then used to select a block within the compressed state-transition rule table that is referred to by the pointer 410. The entire block is then read using one memory access. All transition rule entries in one block are then compared in parallel as described before. Also in this case, the entries are ordered within a block according to decreasing priorities: the next state is taken from the first matching transition rule entry (from left to right). The state register is then loaded with the next state from the selected matching entry.

The process of extracting the compressed index, finding the highest priority matching entry, and updating the state register, is performed for each new input character until one of the two end states (S3 or S5) has been reached.

Index-Mask Calculation for BaRT Compression:

In a preferred embodiment of the present invention, the bits that comprise the compressed index are selected in the following way. This will also be called index-mask calculation because the index mask uniquely defines the bits that are part of the compressed index.

If the current state and input character consist together of a total of m bits, then there exist a total of $2^m$ different possible index masks, that each cover all possible ways of extracting 0, 1, 2, ..., and m bits from the current state and input character. In a first step, all these index masks are determined and ordered by an increasing number of set bits. For example, in FIG. 4 the current state and input character contain a total of m=7 bits. The $2^7$=128 possible index masks, ordered by increasing number of set bits are:

```
0000000,
1000000, 0100000, 0010000, ..., 0000001,
1100000, 1010000, 1001000, ..., 0000011,
1110000, 1101000, 1100100, ..., 0000111,
...
1111110, 1111101, 1111011, ..., 0111111,
1111111
```

Next, these index masks are processed in the given order. For each index mask the maximum number of collisions is determined that occurs for all possible compressed index values corresponding to that index mask, for a given set of transition rule entries. The first index mask for which the maximum number of collisions does not exceed the given collision bound N, is the index mask that will be the result of the index-mask calculation.

If an index mask contains k set bits, then the corresponding compressed index will consist of a total of k bits, and the corresponding compressed state-transition rule table will contain $2^k$ blocks of (at most) N entries. By testing the index masks ordered by increasing number of set bits, the first index mask found will have a minimum number of set bits, resulting in the smallest compressed state-transition rule table (i.e., in the highest compression).

The above index mask calculation is a brute-force approach that tests all possible index masks. The index mask calculation can be made faster and simpler by only testing a selected subset of index masks. This subset can be selected based on the number of transition rule entries in combination with the collision bound N. For example, for a collision bound N=4 and 32 transition rule entries, the compressed state-transition rule table needs to contain at least 8 blocks of N=4 entries (8*4=32) to be able to store all transition rule entries. In order to index 8 blocks, the compressed index needs to consist of at least 3 bits ($2^3$=8). Consequently, only index masks need to be tested that contain at least 3 set bits.

For those skilled in the art, parallelism available in hardware implementations can be used to realize an index-mask calculation that can determine an optimum index mask in a time that is linear with the number of transition rule entries.

Figure 5:
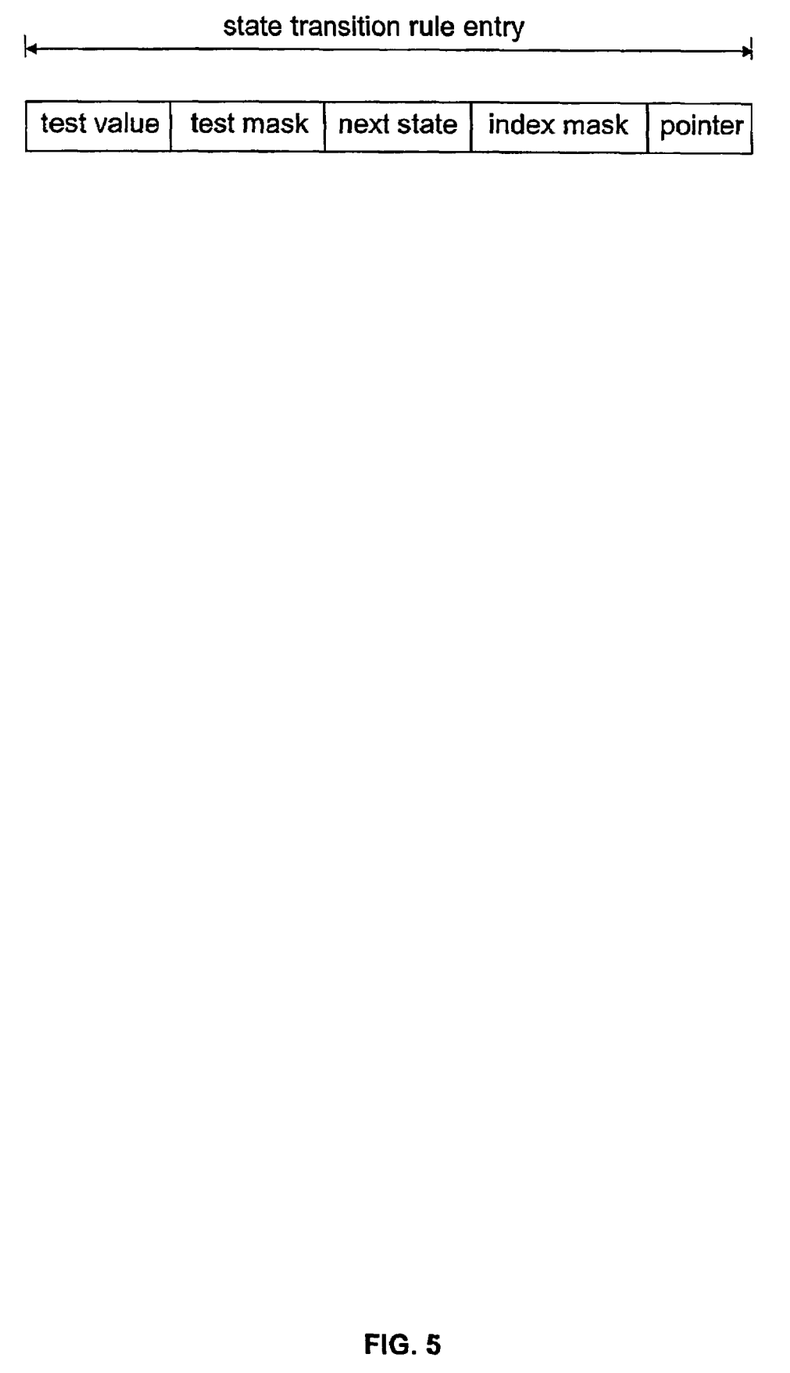
FIG. 5 illustrates the fields within a transition rule entry according to a second preferred embodiment.

Improved Programmable State Machine:

In a second embodiment of the invention, the deep packet processing can be improved. Each transition rule entry as illustrated in FIG. 4 is extended with an index mask and pointer field. Such an entry is shown in FIG. 5. This table entry can be used to implement a programmable state machine for parsing as well as to implement a tree-like structure for searching.

In the aforementioned first preferred embodiment, there is a state register comprising of at least log(s) bits to implement a programmable state machine with s states. The extended transition rule entry allows to support programmable state machines using a smaller state register that has a fixed number of bits independent of the number of states. This allows a more efficient support of state machines with large numbers of states. This will now be illustrated using the example of the state machine in FIG. 1 in order to obtain the data structure shown in FIG. 6. The various steps are described by the flow chart illustrated in FIG. 7.

Figure 7:
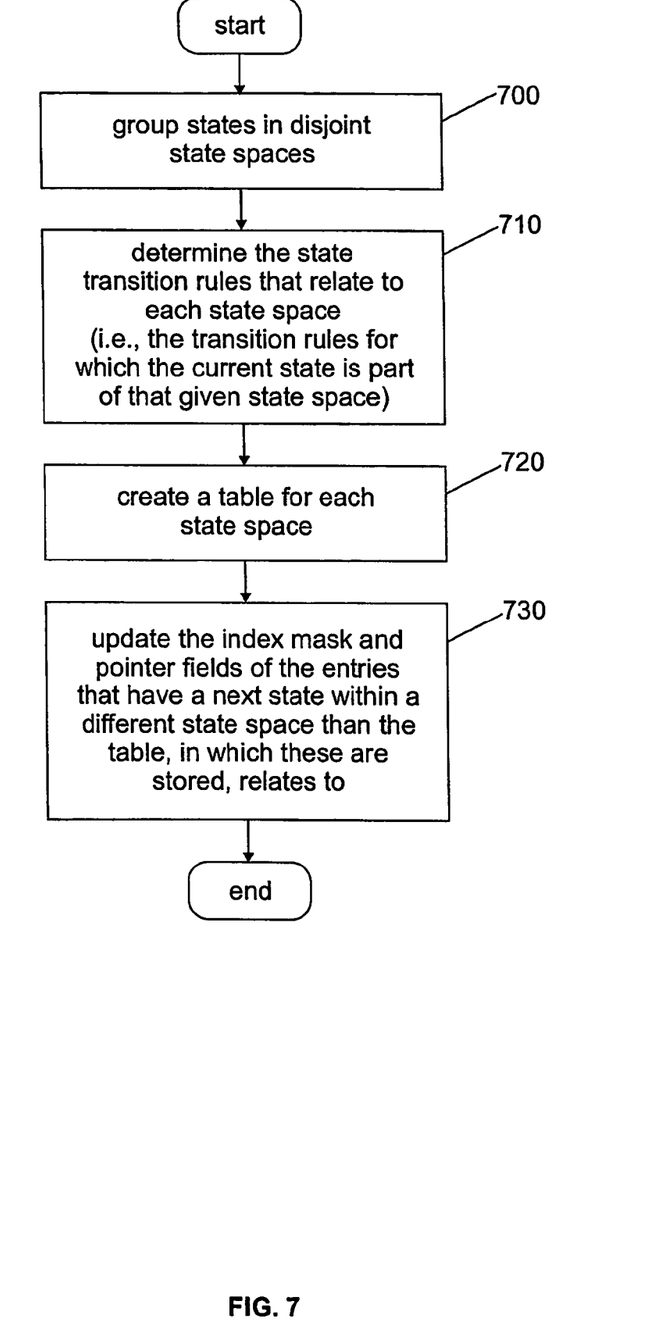
FIG. 7 is the flow chart describing the creation of the data structure according to the second preferred embodiment.

As a first step 700 in the second preferred embodiment, all states are distributed over smaller state spaces and assigned state vectors that are unique within each state space. In this example, the 6 states in FIG. 1 are distributed over 2 state spaces in the following way with the following state-vector assignment:

| State space 1: | State space 2: |
|---|---|
| S0 - 00 | S2 - 00 |
| S1 - 01 | S3 - 01 |
| S5 - 10 | S4 - 10 |

Note that this distribution can be done in any arbitrary way. However, a typical objective of the distribution results from the size of the state register. If, for example, implementation issues or other reasons, result in a state register consisting of k bits, then the states should be distributed over multiple state spaces such that each state space contains at most $2^k$. In this situation, unique state-vectors of at most k bits can be assigned to each state within a state space, which will fit in the state register.

After applying the above distribution of the states over two state spaces, the original state-transition rules can now be written as follows 710:

| transition | state | input | [state input] | | next state |
|---|---|---|---|---|---|
| | | | State space 1: | | |
| 1 | * | 1 | [xx 0001] | -> | S1 [01b - state space 1] |
| 2 | S1 | 2 | [01 0010] | -> | S2 [00b - state space 2] |
| 3 | * | A | [xx 1010] | -> | S4 [10b - state space 2] |
| 4 | * | * | [xx xxxx] | -> | S0 [00b - state space 1] |
| | | | State space 2: | | |
| 1 | S2 | 1 | [00 0001] | -> | S3 [01b - state space 2] |
| 2 | * | 1 | [xx 0001] | -> | S1 [01b - state space 1] |
| 3 | S4 | B | [10 1011] | -> | S5 [10b - state space 1] |
| 4 | * | A | [xx 1010] | -> | S4 [10b - state space 2] |
| 5 | * | * | [xx xxxx] | -> | S0 [00b - state space 1] |

In the next step 720, each state space is implemented using a compressed state-transition rule table in the same way as with the first preferred embodiment. The difference with the first preferred embodiment, is that now the index mask and pointer "associated" with the state space of which the next state is part of, are stored together with the next state in the extended transition rule entries.

Figure 6:
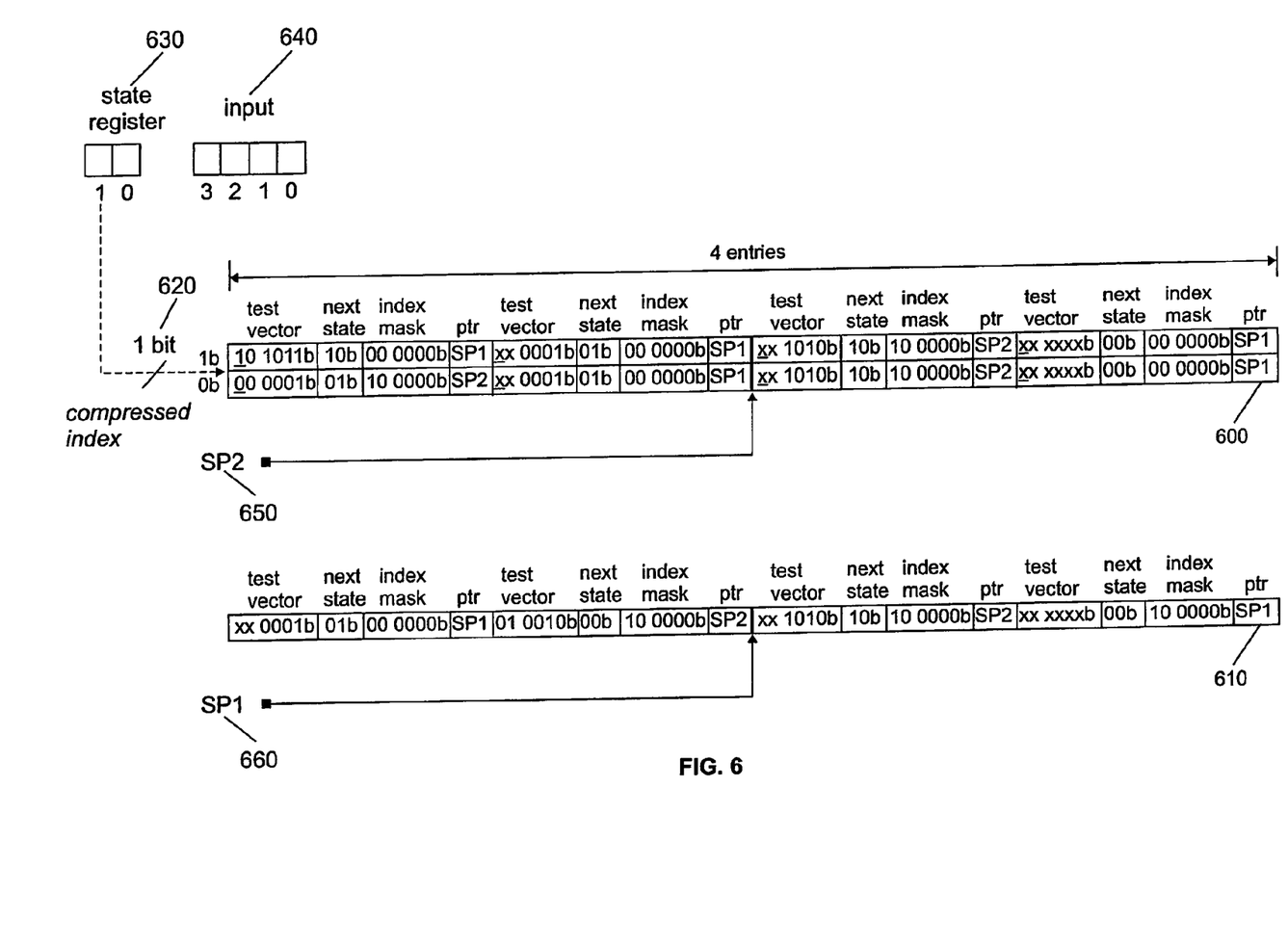
FIG. 6 illustrates two BaRT-compressed state-transition rule tables according to the second preferred embodiment, which implement the state diagram of FIG. 1, and are organized such that a maximum of N=4 transition rule entries are stored in each memory location.

FIG. 6 shows the resulting structure for an implementation in which the memory width allows to store 4 transition rule entries in one location and compare those in parallel. The compressed state-transition rule table 610, corresponding to state space 1, consists of one block of four entries. The compressed state-transition rule table 600, corresponding to state space 2, consists of two entry-blocks, which are selected using a one-bit compressed index 620 which is extracted from the current state register 630 and 4-bit input character 640. The two base pointers 650 and 660 corresponding to the two compressed tables are denoted as SP1 and SP2, respectively.

Figure 8:
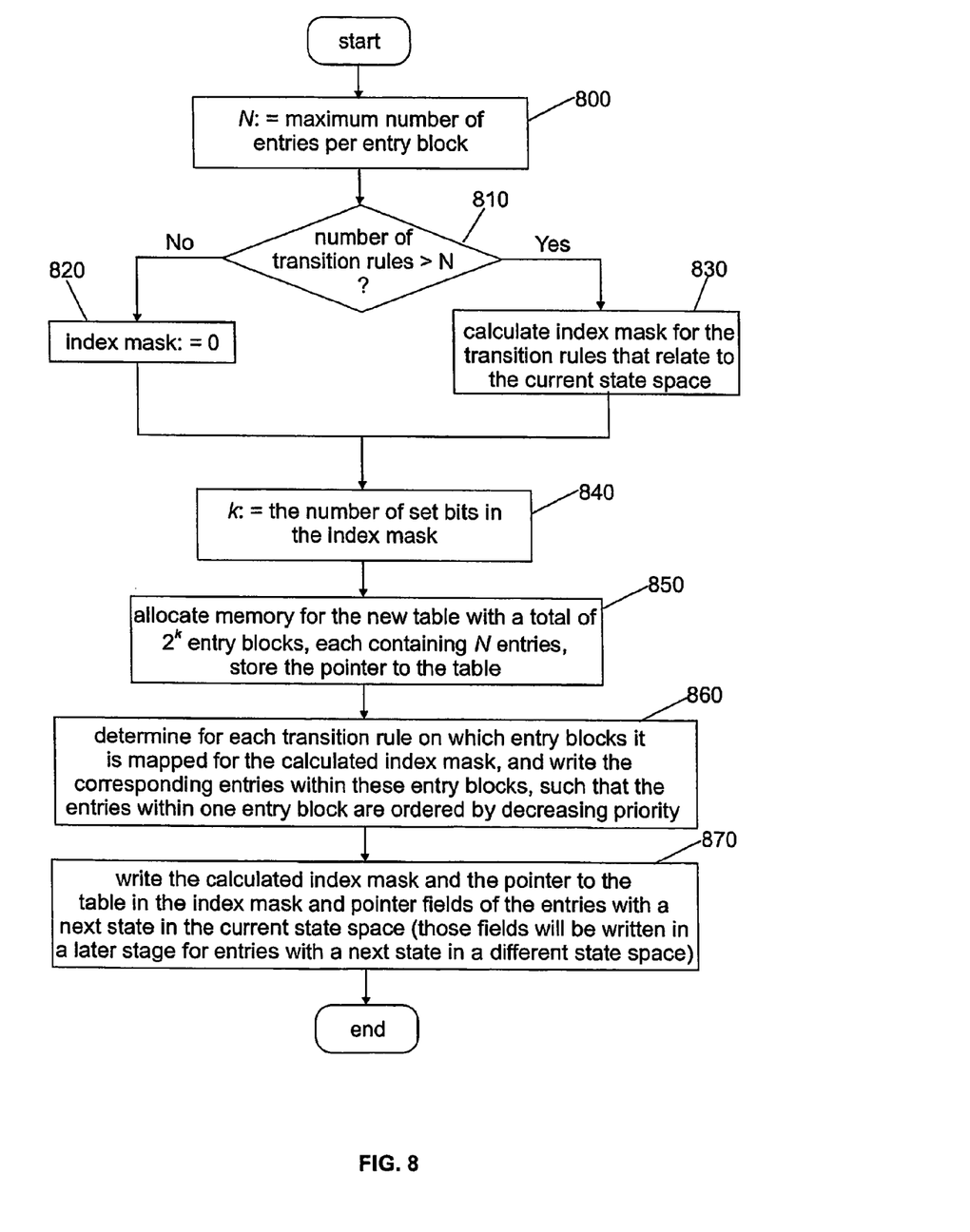
FIG. 8 is the flow chart describing the creation of the compressed state-transition rule table which is one step of the creation of the data structure as described in FIG. 7.
Figure 9:
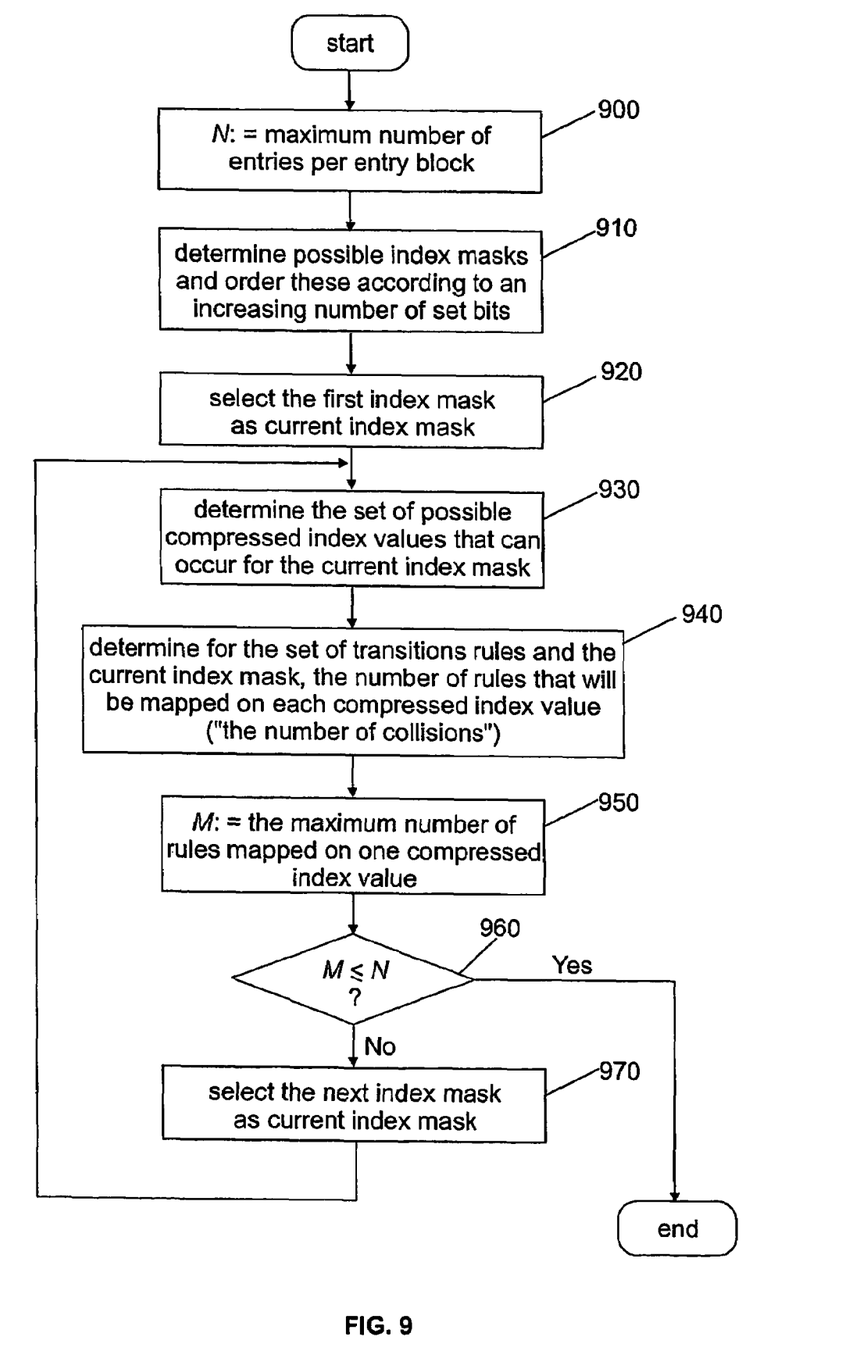
FIG. 9 is the flow chart describing the calculation of an index mask for distributing transition rule entries over a minimum number of entry-blocks, which is one step of the creation of the compressed state-transition rule table as described in FIG. 8.

FIG. 8 and FIG. 9 show the flow charts describing the creation of a compressed state-transition rule table for each state space 720. This will now be explained for the second state space, which involves 5 entries with the following test vectors:

| | |
|---|---|
| entry 1 | 00 0001 |
| entry 2 | xx 0001 |
| entry 3 | 10 1011 |
| entry 4 | xx 1010 |
| entry 5 | xx xxxx |

The maximum number of entries per entry-block equals N=4 800, 900. The number of transition rules equals 5, which is larger than the maximum number of entries per entry-block (answer Yes to test 810), therefore the compressed table will contain multiple entry-blocks, that have to be indexed by a compressed index. For this purpose, an index mask must be calculated 830 in the following way. First all possible index masks are determined and ordered by an increasing number of set bits 910. Fewer set bits correspond to a smaller compressed index, fewer entry blocks and therefore a better compression. There exist a total of 63 ($2^6-1$) possible non-zero values of a 6-bit vector (2 bits state+4 bits input), which are, ordered according to an increasing number of set bits:

```
100000b
010000b
001000b
000100b
000010b
000001b
110000b
101000b
100100b
...
111111b
```

The first index mask is 100000b 920. To this index mask correspond two possible compressed index values, namely 0b and 1b 930. For this index mask the entries will be mapped on the two compressed index values in the following way 940:
0b: entries 1, 2, 4, 5
1b: entries 2, 3, 4, 5

(this mapping is obtained by taking the left-most bit of the test vector: in case of a 0b, the entry is mapped on index 0b, in case of a 1b, the entry is mapped on index 1b, in case of a xb, the entry is mapped on both index 0b and index 1b).

The maximum number of entries mapped on one compressed index value equals M=4 950. Because M<=N (smaller or equal), this index mask is selected (answer Yes to test 960). If M>N (answer No to test 960), the next index mask is selected (970).

The number of set bits in index mask 100000b equals k=1 840. Consequently, the table consists of $2^k=2$ block entries (corresponding to both compressed index values) each containing N=4 entries. Therefore the table contains a total of 2*4=8 entries. After sufficient memory has been allocated 850, the entries can be written within each of the two blocks (as shown above: entries 1,2,4,5 on compressed index value 0b, and entries 2,3,4,5 on compressed index value 1b) ordered by decreasing priority 860. The same procedure is used to construct a compressed table for state space 1. In this case, the number of transition rules is not larger than the number of entries in one entry block (N=4); answer No to test 810. Consequently, the index mask equals 000000b 820 and the compressed table consists of only one entry block 840, 850, 860. After both tables have been constructed, the index mask/pointer combination for each table can be written in the corresponding fields within the entries involving next states in the corresponding state spaces 870, 730.

In practical implementations, the number of entries is typically much greater than with the state diagram used to illustrate those various embodiments of the present invention presented herein.

Figure 10:
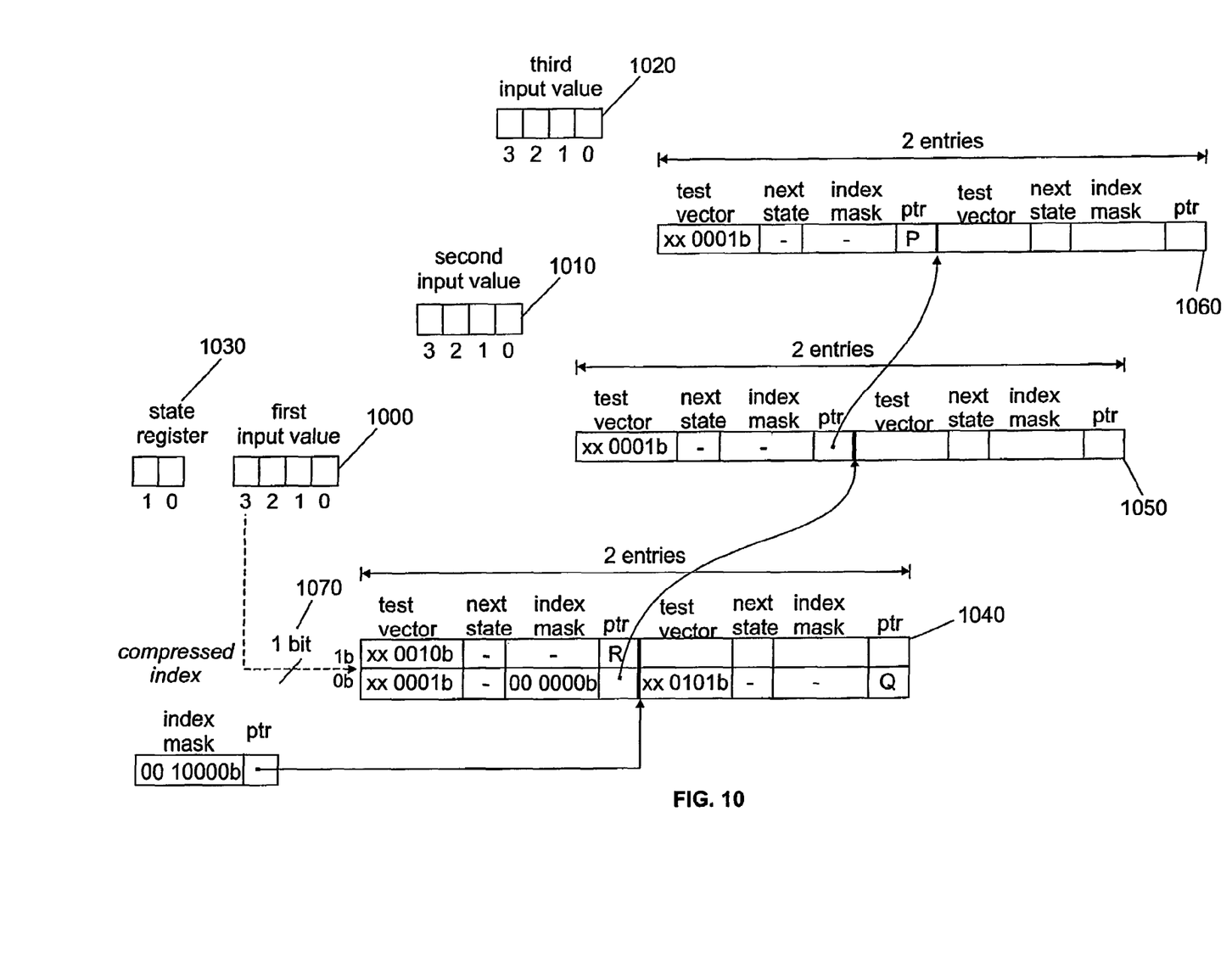
FIG. 10 illustrates a data structure consisting of three BaRT-compressed tables according to the second preferred embodiment, which implement a prefix-match search on three input characters, and are organized such that a maximum of N=2 entries are stored in each memory location.

Searching:

FIG. 10 illustrates an example of a data structure according to the aforementioned second preferred embodiment, that can be used for searching. The state register and the next state fields in the transition rule entries within the compressed tables are not used in this search, and the two left-most bits within the test vectors that correspond to the state register equal xxb (don't care).

The data structure implements a prefix search on a 12-bit vector consisting of a first 1000, second 1010, and third 1020 4-bit input value as shown in FIG. 10. The prefixes and corresponding search results are:

| prefix | prefix length | search result |
|---|---|---|
| prefix 1: 0001 0010 0011b (123h) | 12 | P |
| prefix 2: 0101b (5h) | 4 | Q |
| prefix 3: 1010b (Ah) | 4 | R |

The data structure for this example consists of three compressed tables, that are each "indexed" by one of the input values. The compressed table that is indexed by the first input value, is used to determine whether the above prefixes might match the input, based on the first 4 bits of those prefixes, which are 0001b (prefix 1), 0101b (prefix 2), and 1010b (prefix 3). The test vectors corresponding to those prefixes are: xx 0001b (prefix 1)
xx 0101b (prefix 2)
xx 1010b (prefix 3)

(the bit positions related to the state register (1030) contain xxb as mentioned above).

In this example, the number of entries per entry-block is chosen to be equal to N=2. For this value of N and the above test vectors, the compressed index computed according to the BaRT algorithm consists of one bit 1070, and the entries related to prefix 1 and prefix 2 are mapped on a compressed index value of 0b, and the entry related to prefix 3 is mapped on a compressed index value 1b.

Both prefix 2 and prefix 3 have a length equal to 4. Consequently, if the test vector stored in the entry corresponding to each of those prefixes, would match the first 4-bit input value, then this means that the corresponding prefix matches the input character. In that case the search result can be retrieved from the pointer field of the matching entry. If the first input value equals '5'h, then the result will be Q. If the first input value equals 'A' h, then the result will be R.

Prefix 1 has a length equal to 12. This implies that all three input values 1000, 1010, 1020 have to be tested in order to determine whether this prefix is matching. This is implemented in the following way in the data structure in FIG. 10. The first input value 1000 is tested by the compressed table 1040. If the first input value would match the test vector xx 0001b that is stored in the entry related to prefix 1, the leftmost entry in the entry-block corresponding to a compressed index value 0b, then the index mask and pointer fields of this entry are retrieved and used to access a second compressed table 1050, which tests the second input value 1010. The only valid entry in this table contains a test vector starting with xxb (for the state register) followed by the second group of four bits of prefix 1, resulting in xx 0010b. If this test vector matches the second input value 1010, then the index mask and pointer fields of this entry are retrieved and used to access a third compressed table 1060, which tests the third input value 1020. The only valid entry in this table contains a test vector starting with xxb (for the state register) followed by the third group of four bits of prefix 1, resulting in xx 0011b. If this test vector matches the third input value 1020, this means that prefix 1 is matching the given set of three input values. In that case, the search result can be retrieved from the pointer field of the matching entry. If the three 4-bit input characters equal '123'h, then the result will be P.

Figure 11:
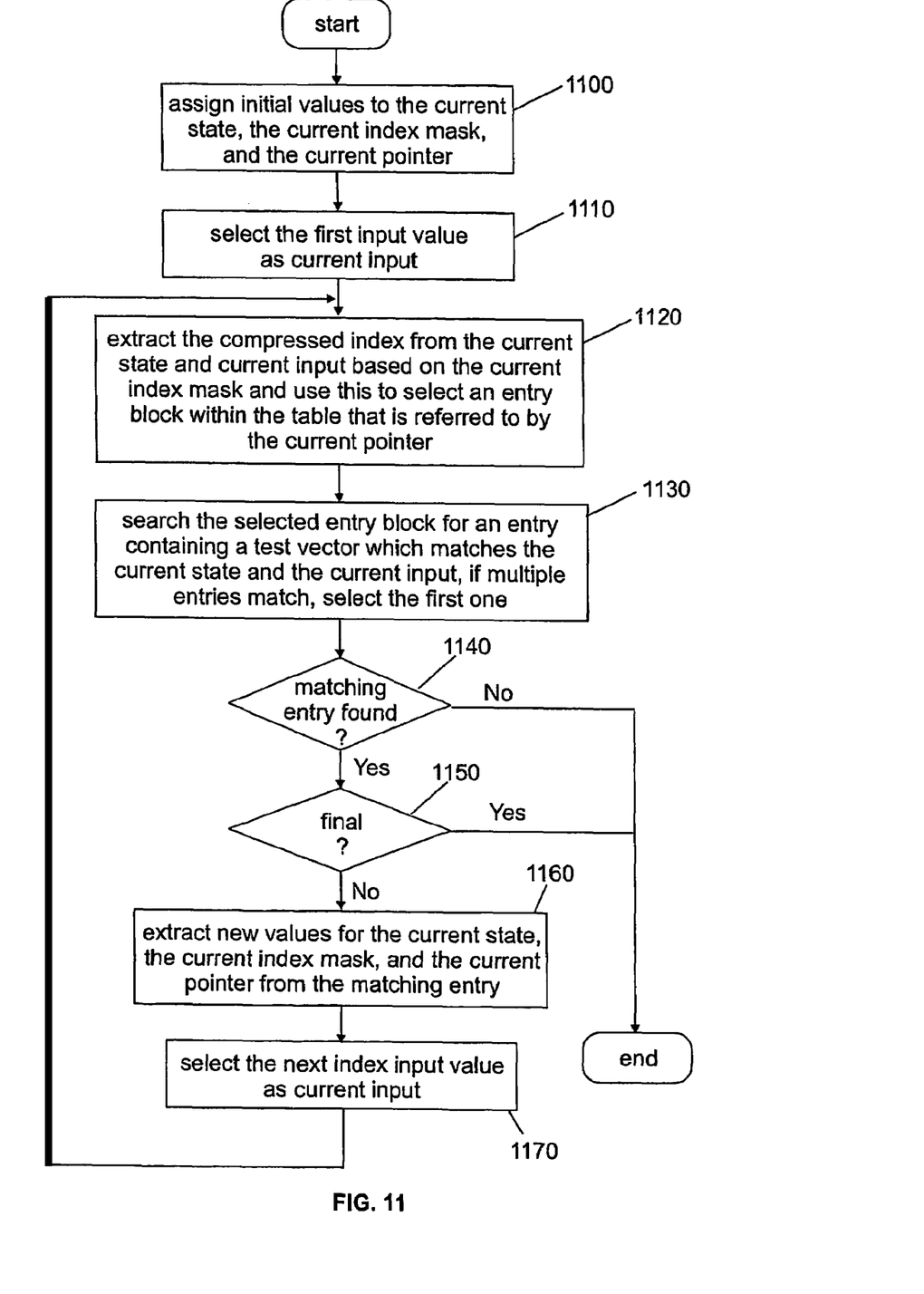
FIG. 11 illustrates a flow chart for the process of searching and parsing according to the second preferred embodiment.

Parse and Search operation:

The flow chart of FIG. 11 illustrates an example of a method for parsing and searching according to the second preferred embodiment. The first step 1100 is to initialize the state register, the current index mask and the current base pointer with values that correspond to the first compressed table involved in the parse or search operation. Next step 1110 is to select the first input character to be analyzed. The next step 1120 is to extract the compressed index value from the input data and state register, based on the current index mask, and to use this to select an entry-block within the compressed table that is referred to by the current base pointer. In the next step 1130 a matching entry is searched within the selected entry-block, by comparing the test vector in each entry against the state register and input character. The first matching entry found is selected. The operation ends if no match is found: answer No to test 1140. If a match is found; answer Yes to test 1140, there is a first case where the entry read is final: answer Yes to test 1150. For parsing, this means that the end-state of the state machine has been reached; S3 and S5 in the example of FIG. 1. For searching, this means that a result has been found (as an example, R for the input value of 'A' h in the example of FIG. 10). A final entry can be identified in many ways, for example, using a flag bit or a special value for the pointer. In this case, if a final entry is found then the operation ends. If the matching entry is not a final entry; answer No to test 1150, then new values for the current state register, current index mask and current based pointer are extracted from the matching entry and become the current values 1160 and a new 4-bit character value is selected 1170. Based on the new values, the loop starting with 1120 is entered again. This loop is executed until no matching entry is found, answer No to test 1140, or a final entry is found to be matching, answer Yes to test 1150.

Algorithm for Deriving Prioritized State-Transition Rules

Figure 12:
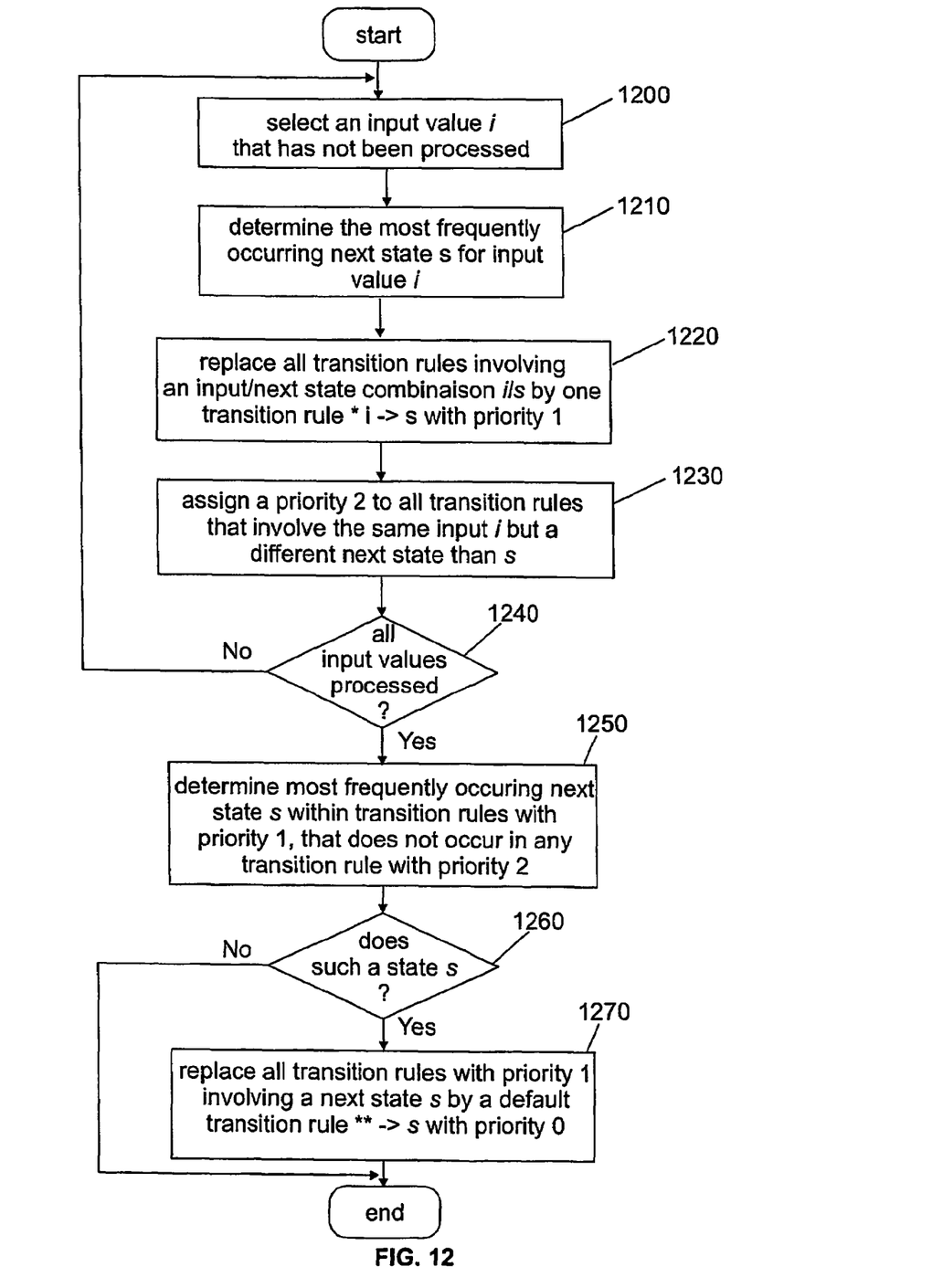
FIG. 12 illustrates a flow chart for deriving a prioritized list of state-transition rules according to the first and second preferred embodiment, each involving a ternary match condition on the current state and input value, for a given state diagram.

FIG. 12 shows a flow chart describing an example of a method for deriving a prioritized list with state-transition rules, which each involve a ternary match condition on the current state and input value. This method may be used for building the data structure supporting the programmable state machine of the embodiments of the invention. This algorithm will be explained using the example of the state diagram shown in FIG. 1. The state transitions for this state diagram are:

| state | input | | next state |
|-------|-------|----|-----------|
| S0 | 0, 2 . . . 9, B . . . F | -> | S0 |
| S1 | 0, 3 . . . 9, B . . . F | -> | S0 |
| S2 | 0, 2 . . . 9, B . . . F | -> | S0 |
| S4 | 0, 2 . . . 9, C . . . F | -> | S0 |
| S0 | 1 | -> | S1 |
| S1 | 1 | -> | S1 |
| S4 | 1 | -> | S1 |
| S1 | 2 | -> | S2 |
| S2 | 1 | -> | S3 |
| S0 | A | -> | S4 |
| S1 | A | -> | S4 |
| S2 | A | -> | S4 |
| S4 | A | -> | S4 |
| S4 | B | -> | S5 |

An input value i that has not been processed is selected 1200. Next, for this input value i, the most frequently occurring next state s is determined 1210, and all transitions with input value i to that next state s are replaced 1220 by one transition rule "*i →s" with a priority 1. All transitions that involve the same input i but a different next state than s, are assigned a priority 2, 1230. These steps are repeated, answer No to test 1240, until all the input values are processed: answer yes to test 1240.

The loop execution results in:

| state | input | | next state | priority |
|-------|-------|----|-----------|----------|
| * | 0 | -> | S0 | 1 |
| * | 1 | -> | S1 | 1 |
| * | 2 | -> | S0 | 1 |
| * | 3 | -> | S0 | 1 |
| * | 4 | -> | S0 | 1 |
| ... | ... | ... | ... | ... |
| * | 9 | -> | S0 | 1 |
| * | A | -> | S4 | 1 |
| * | B | -> | S0 | 1 |
| ... | ... | ... | ... | ... |
| * | F | -> | S0 | 1 |
| S1 | 2 | -> | S2 | 2 |
| S2 | 1 | -> | S3 | 2 |
| S4 | B | -> | S5 | 2 |

The next step 1250 is now to determine the most frequently occurring next state s within transition rules with priority 1, that does not occur in any transition rule with priority 2. If such a state does not exist the transition rule list is completed: answer No to test 1260, the method ends. Such a state exists in the example, namely S0: answer Yes to test 1260. All transition rules with priority 1 involving a next state S0 are now replaced by a default transition rule * * →S0 with priority 0, 1270.

This results in:

| state | input | | next state | priority |
|---|---|---|---|---|
| * | * | -> | S0 | 0 |
| * | 1 | -> | S1 | 1 |
| * | A | -> | S4 | 1 |
| S1 | 2 | -> | S2 | 2 |
| S2 | 1 | -> | S3 | 2 |
| S4 | B | -> | S5 | 2 |

The invention claimed is:

1. A method implemented in a chip embedded apparatus for performing deep processing on an input variable word bit chain, said method comprising the steps of:
    creating a state table based on at least one initial state, and a final state, said state table having entries, each said entry defining a state-transition rule comprising a s-bit current state, a n-bit word of the input variable word bit chain and a s-bit next state;
    converting the entries of the state table into a reduced number of state-transition rule entries, each entry containing a ternary match condition expressed as a s+n-bit test value and a s+n-bit test mask to be applied to a the current state and an input word in combination, said each entry further containing the s-bit next state, to provide a reduced state table with entries;
    ordering the reduced state table entries obtained by the execution of the converting step, in a prioritized order, with most frequently used state-transition rules having the highest priority;
    initializing a current state as being the initial state and a the first word of the chain being a current input word;
    testing a ~he current state and a the current input in combination, against the test value, using the test mask, in all the entries of the reduced state table until a match is found on at least one entry;
    if multiple entries match, selecting one entry with the highest priority to be a selected matching entry;
    if the next state read in the state-transition rule of the selected matching entry is not a final state, defining a next word of the input word chain as being a current input and the next state being the current state;
    repeating the testing, selecting and defining steps until a final state is found, and before the initializing step comprising the further steps of:
    defining as a hash index for the reduced state table, a set of i bit locations inside the s-bit current state and an the input n-bit word in combination, and an integer N, such that, at most, N table entries can match a hash index value;
    creating a compressed state table, indexed by the hash index, having $2^i$ entries, each entry corresponding to one value of the hash index, and each having a maximum of N state-transition rules of the reduced state table corresponding to the same hash index value and written in a priority order;
    saving an s+n bit index mask corresponding to the hash index, and saving a base address pointer of the compressed state table; and
    said testing step further comprises an initial step of identifying the hash index of a current state and current input in combination, using the index mask, and testing the hash index to identify a corresponding entry in the compressed state table located using the base address pointer, the following testing step against the test value and the following steps being performed on the maximum of N state-transition rules of the identified said corresponding entry in the compressed state table,
    dividing the compressed state table into more than one compressed state sub-table;
    extending in each of the compressed state sub-tables, each state-transition rule with a corresponding index mask and a base address pointer of the compressed state sub-table of the next state in said state-transition rule;
    initializing a current compressed state sub-table base address pointer, and
    the base address pointer of a matching entry becoming the current base address pointer of the compressed state of the next state.

* * * * *